United States Patent [19]

Jacobs

[11] Patent Number: 4,909,703

[45] Date of Patent: Mar. 20, 1990

[54] MOTION DAMPING APPARATUS FOR WIND DRIVEN PROPELLERS

[76] Inventor: Paul R. Jacobs, 8020 Strehler Rd., Corcoran, Minn. 55340

[21] Appl. No.: 279,023

[22] Filed: Dec. 2, 1988

[51] Int. Cl.⁴ .............................................. F03D 7/04
[52] U.S. Cl. ..................................... 416/89; 416/136; 416/140
[58] Field of Search ............. 416/89 A, 132 B, 136 R, 416/140 R

[56] References Cited

U.S. PATENT DOCUMENTS

| | | | |
|---|---|---|---|
| 1,979,616 | 11/1934 | Haidle et al. | 416/89 A |
| 1,982,039 | 11/1934 | Youngberg | 416/89 A |
| 2,029,503 | 2/1936 | Peterson | 416/89 A |
| 2,050,142 | 8/1936 | White | 416/132 B |
| 2,096,860 | 10/1937 | Renquist et al. | |
| 2,464,234 | 3/1949 | Jacobs | 416/89 A |
| 2,505,969 | 5/1950 | Jacobs | 416/136 R |
| 4,068,131 | 1/1978 | Jacobs et al. | 416/89 X |
| 4,088,420 | 5/1978 | Jacobs et al. | 416/9 |
| 4,297,075 | 10/1981 | Jacobs et al. | 416/140 R X |
| 4,324,528 | 4/1982 | Svenning | 416/132 B |
| 4,366,387 | 12/1982 | Carter, Jr. et al. | 416/132 B X |
| 4,522,564 | 6/1985 | Carter, Jr. et al. | 416/11 X |

FOREIGN PATENT DOCUMENTS

| | | | |
|---|---|---|---|
| EP95807 | 12/1983 | European Pat. Off. | 416/41 A |
| 951709 | 10/1956 | Fed. Rep. of Germany | 416/140 R |
| 2834786 | 2/1980 | Fed. Rep. of Germany | 416/140 R |
| 3115202 | 11/1982 | Fed. Rep. of Germany | 416/140 R |
| 2010980 | 7/1979 | United Kingdom | 416/140 R |

*Primary Examiner*—Everette A. Powell, Jr.
*Attorney, Agent, or Firm*—Shoemaker and Mattare, Ltd.

[57] ABSTRACT

A multi-blade, variable pitch wind driven propeller in which a shock absorber is connected with each blade to dampen movement in both the radially inward and radially outward movements of the blade. Tension springs are connected with the blades to move them inwardly against centrifugal force, and in a preferred form of the invention, the tension spring has a variable rate so that it exerts greater resistance near its limit of outward travel. A coil compression spring may also be connected with each blade to absorb loads at the inner limit of travel of the blade and to impart an initial impetus to outward movement of the blade. In addition, retrofit lock nut means is provided for attachment to the ball stud connected to the butt end of each blade to extend along substantially the entire length of the stud and achieve a ratio of ball stud diameter, in inches, to rotor radius, in feet, of least as much as 0.100, thereby minimizing the risk of failure of the stud.

17 Claims, 3 Drawing Sheets

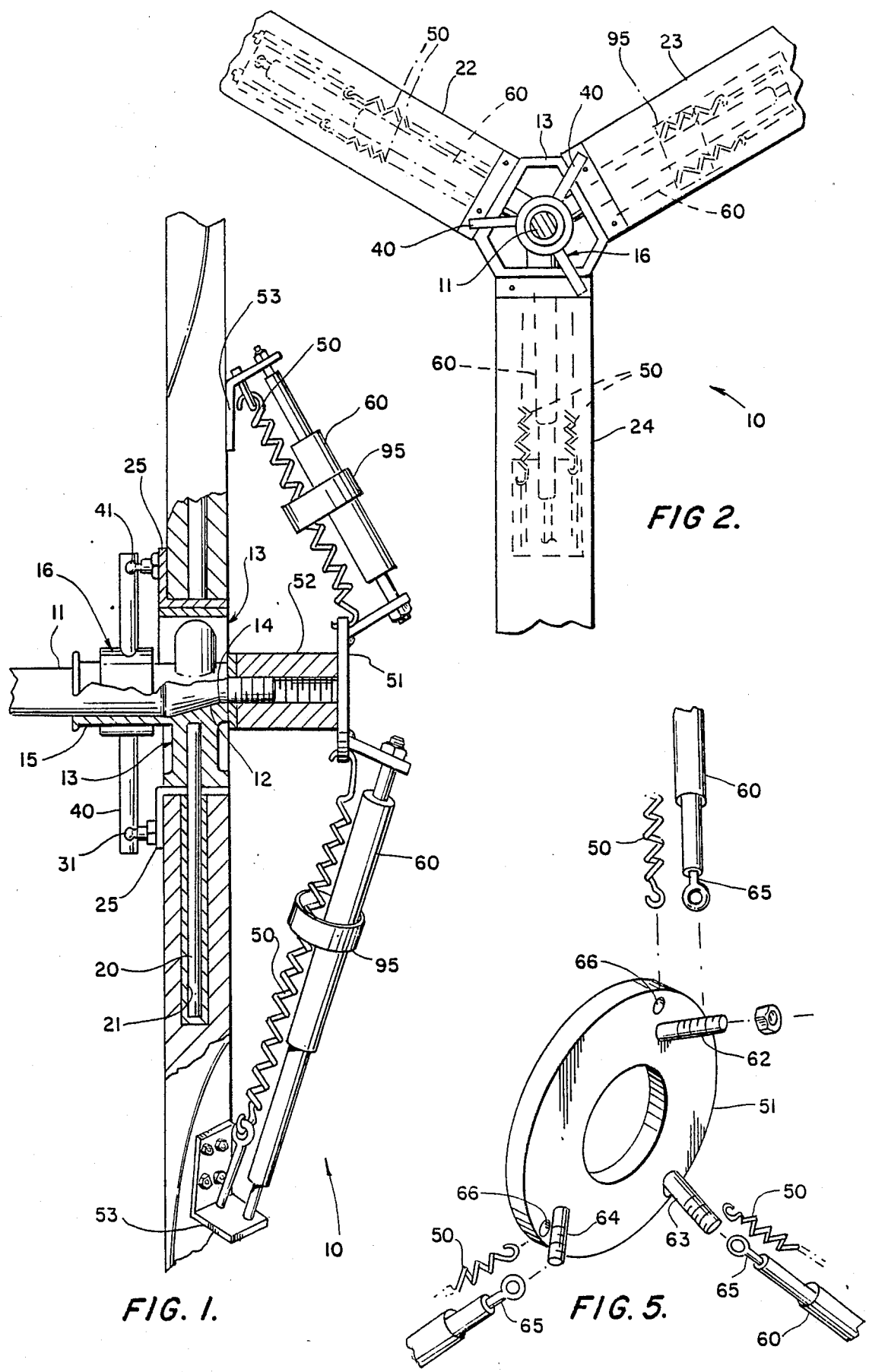

MOTION DAMPING APPARATUS FOR WIND DRIVEN PROPELLERS

BACKGROUND OF THE INVENTION:

This invention relates to a wind energy power system of the type using a multi-blade propeller for producing power from wind energy. Such systems typically employ a multiblade, wind-driven, variable pitch propeller supported at the top of a tower and connected through a direct drive or speed increaser or other arrangement for driving an output shaft supported on the tower. The output shaft may be connected to power a pump for pumping water or other material, or for operating a compressor for refrigeration or other uses, or for the production of mechanical power or electrical energy for any desired use. More particularly, the invention relates to a damping apparatus for damping pitch change movement of the propeller, and represents an improvement over the structures described in applicant's earlier patents 2,505,969 and 4,068,131.

DESCRIPTION OF THE PRIOR ART:

Many different types of wind electric plants have been developed for generating electrical power from wind energy, including the structures disclosed in applicant's earlier patents 2,464,234, 2,505,969, 4,068,131 and 4,088,420. In these patents, and especially in Pat. No. 4,068,131, the propeller blades 25 are movably mounted on rods 26 secured to a hub. A pitch adjusting governor arrangement 21 is connected with the propellers to adjust their pitch as they move outwardly on the rods under the influence of centrifugal force. Springs 27 are attached to the propeller blades to urge them inwardly toward the hub against the effect of centrifugal force, and to restore the pitch of the propeller at low wind velocities. This change in pitch of the propeller occurs automatically with changes in wind velocity to avoid damage to the propeller and associated structure at high wind velocities.

A snubber 64 is associated with each spring to slow outward movement of the propellers to thus prevent excessively rapid pitch changes and avoid destructive flutter of the propeller blades during operation at high wind velocities. This air snubber arrangement is capable of restraining only outward movement of the blade, however, and does not control inward movement of the blade in response to the tension springs as the centrifugal force abates. In practice, the tension springs may exert upwards of 3,000 to 4,000 pounds of force per blade when extended under the influence of high wind velocities. Upon abatement of the centrifugal force during brief lulls in wind velocity, the blade is pulled with considerable force back inwardly toward the hub. This action has been observed to bend blade brackets and even to break or bend the ball sockets on the governors. When unrestrained by a snubber, the blades either over- or under-pitch under the influence of inertia, thus inducing excessive sway to the tower for several oscillations and in so doing impart excessive strain on the entire wind system components.

Other prior art structures are disclosed in U.S. Pat. Nos. 1,979,616, 2,050,142, 2,096,860, 2,464,234 and 2,505,969. Some of the wind electric plants disclosed in these prior art patents utilize variable pitch propeller blades which are automatically governed or self-regulating for changing wind conditions. However, prior art wind electric plants typically have relatively small diameter propellers, as, for example, on the order of about 10 feet in diameter. Accordingly, the forces encountered are relatively small and easy to handle. For example, pitch adjusting structures and blade stop means can be accommodated through various parts of the governor structure, and pitch changes of the propeller blades can be accomplished at all operating speeds of the wind plants because the spring forces and propeller blade sizes and weights are relatively small.

However, the trend in recent years to larger propellers for production of greater amounts of power has resulted in the inadequacy of conventional structures for governing pitch changes and the like. For instance, manufacturing errors sometimes result in the spider hub (item 16 in Pat. No. 2,464,234) being oversized, thereby causing it to bind or lock on the sleeve 7 when it is driven quickly with no damping of its motion, resulting in too much energy capture by the rotor before it can release and re-pitch the blades. Moreover, excessive strain is sometimes transferred directly onto the blade butt bracket and/or the governor ball and socket equalizer yoke in prior art structures. In larger installations, where upwards of 4,000 pounds of pressure can be exerted by the return springs, and under the gusty, turbulent wind environments frequently encountered, damage to the propeller and/or associated structure can result.

It has further been observed that the use of a single spring and/or spring tensioning bolt on the larger diameter propellers results in over-stressing of these components, particularly when higher wind speeds, i.e. on the order of 50 to 100 mph, are encountered during storm conditions, for example. Moreover, standard tension springs as used in prior art devices have a constant rate over the operating range. Analysis of ball sockets from blade-actuated governors that have run for prolonged periods of time discloses that some have been bent from outwardly directed centrifugal force. This is an indication that the blades were not fully restrained by the springs during periods of high wind speeds and extreme feathering of the blades, but instead, the blades "hung" on the ball sockets of the governor mechanism. With large rotors, even two springs have not been adequate and a third or more may be needed to balance the load.

In other prior art installations, it has been found that the stud bolts and or governor shafts tend to fail with fatigue fractures after a period of time. This is apparently due to the direct transfer of loads from the propeller to the governor mechanism, including the ball and yoke assembly, under conditions of frequent rapid pitch changes. The aerodynamic forces acting on the blades results in them acting as levers, and these loads are transferred to the hub and equalizer assembly.

SUMMARY OF THE INVENTION:

It is, therefore, an object of this invention to provide a wind energy power system of the type having multiblade propellers with automatically operable pitch adjusting means responsive to variable wind conditions, and in which pitch adjusting motion is regulated to avoid excessively rapid pitch changes and/or underpitching due to inertia or binding, thus resulting in a smoother operating wind system that avoids excessive strain to the components by not overflattening its blades to absorb excessive wind energy.

Another object of the invention is to provide a wind energy power system having variable pitch multiblade propellers, in which a dual action motion damping structure is operatively connected with the pitch adjusting means to dampen propeller blade movement during both positive and negative pitch adjustments to insure smooth energy capture.

A further object of the invention is to provide a pitch adjusting structure for multiblade, variable pitch wind driven propellers which move radially outwardly under centrifugal force, and in which variable rate spring means is connected with the propellers to provide increased resistance to outward movement of the propellers as they near their outer limit of travel.

Another object of the invention is to use readily available and replaceable shock absorber means of the automotive type in association with other motion damping means on multiblade propeller pitch adjusting structures in wind energy plants.

A still further object of the invention is to provide retrofit bracket means for replacement of OEM brackets on pitch adjusting structures in multiblade variable pitch propeller wind energy plants, for accommodating higher loads and/or multiple retention spring and motion damping means.

Yet another object of the invention is to provide readily available and replaceable shock absorbers for use as bi-directional motion damping means on variable pitch propeller blades in wind energy plants, and wherein overload coil springs are associated with the shock absorbers for imparting initial movement to the propeller blade at the initiation of a pitch change to help initiate the pitch change process.

A further object of the invention is to provide multiple motion restraining means in association with variable pitch, multiblade propellers on wind energy plants, thereby providing back-up motion restraining means in the event of failure of one of said means.

An even further object of the invention is to provide a minimum ratio between the diameter of the ball socket stud which attaches the propeller blade to the equalizer yoke assembly, and the radius of the rotor, to minimize the risk of stud failure where it attaches to the blade bracket.

Yet another object of the invention is to provide a minimum ratio between the diameter of the governor shaft and the radius of the rotor to minimize the risk of governor shaft failure.

A still further object of the invention is to provide a minimum ratio between the diameter of the output drive shaft at the back of the governor hub and the radius of the rotor to minimize the risk of drive shaft fatigue failure.

These and other objects and advantages of the invention are achieved by attaching readily available, off-the-shelf shock absorbers of the automotive type in parallel with the tension springs connected to return the propeller blades inwardly against centrifugal force. The shock absorbers dampen motion in both directions of the blade, e.g. radially inwardly and radially outwardly, and minimize the risk of damage to the mounting brackets, pitch adjusting structure and other elements of the installation. Further, the shock absorbers are mounted to the attaching brackets so that they are accessible for replacement without having to disassemble other components of the system.

In one variation, an overload coil spring is positioned around the shock absorber to further absorb loads at the inward limit of travel of the propeller blade, and to provide an initial boost to movement of the blade outwardly on its support.

Applicant has further discovered that a particular relationship exists between the diameter of the base of the ball stud which connects the equalizer yoke assembly to the propeller, and the radius of the rotor defined by the propeller blades, at which risk of failure of the stud due to fatigue fracture or overloading is minimized. Similar relationships have been discovered for the ratios between the governor shaft diameter and the rotor radius, and the drive shaft diameter at the back of the hub and the rotor radius. In the first instance, a suitable ratio has been found to be at least as great as about .09, and preferably at least about .100; and in the second instance, a suitable ratio is at least as great as about .120, and preferably at least about .140; and, in the last instance, a suitable ratio is at least as great as about .175 and preferably at least about .210.

Retrofit bracket means, and/or stud reinforcing attachments have been developed by applicant for assisting in meeting the ratios noted above in existing installations. Additionally, the hub may be bored out in some installations in order to permit the hub to ride farther up on the drive shaft.

Other variations include multiple tension springs and/or shock absorbers, and/or springs having variable rate so that greater resistance is offered by the spring at its limit of travel.

An additional safety feature developed by applicant is the provision of a wrap positioned around the tension spring and shock absorber to retain the approximate operative position of one of these units in the event of failure of that unit.

BRIEF DESCRIPTION OF THE DRAWINGS:

The foregoing will become apparent from the following detailed description and claims when considered in conjunction with the accompanying drawings, wherein like reference characters designate like parts throughout the several views, and wherein:

FIG. 1 is a fragmentary view in side elevation, with parts shown in section, of the improved motion damping means of the invention;

FIG. 2 is a fragmentary front elevational view of the invention of FIG. 1;

FIG. 5 is an enlarged, exploded perspective view of the modified attachment to the equalizer plate;

Figure 6:
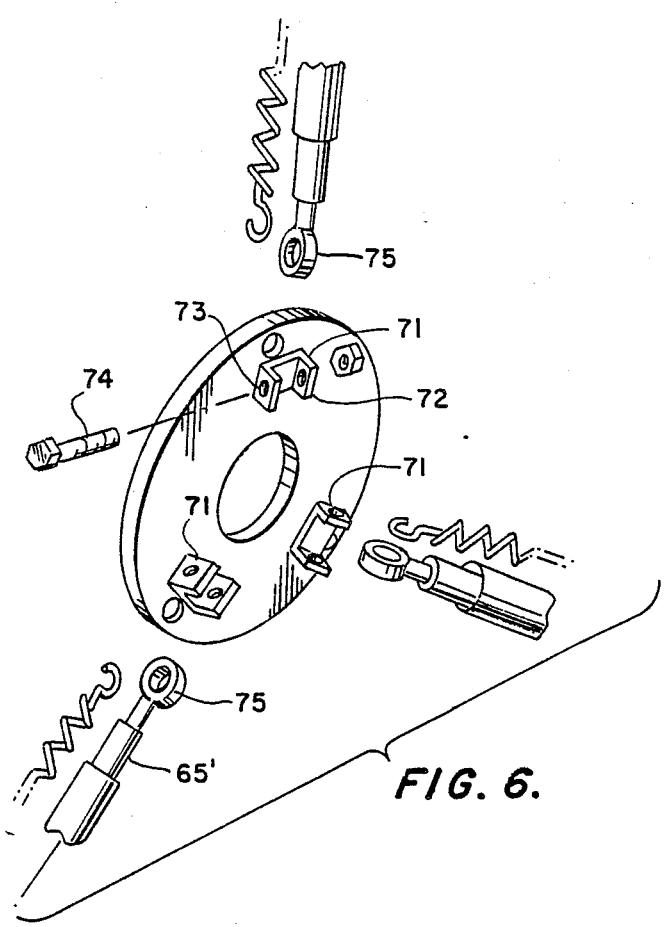
FIG. 6 is an enlarged fragmentary exploded view of a variation of the equalizer plate attachment structure.

DETAILED DESCRIPTION OF THE INVENTION:

Referring more specifically to the drawings, a variable pitch, multi-blade propeller is indicated generally at 10 in FIGS. 1 and 2. In a conventional wind energy plant, the propeller is supported at the top of a tower (not shown) and its output shaft 11 is connected by direct drive or through suitable gearing (not shown) or any other suitable arrangement to generator means or other apparatus to be driven by the wind energy. A typical example of a prior art output structure is depicted in applicant's earlier Pat. No. 4,068,131.

The output or propeller shaft 11 has a tapered forward end 12, and a spider hub 13 with a complemental inside taper 14 is fitted on the tapered forward portion 12 of the output shaft. A rearwardly extending governor sleeve portion 15 projects rearwardly from the hub in concentric relationship with the output shaft and a governor yoke assembly 16 is axially slidable on the sleeve.

A plurality of governor shafts 20 are secured at one end to the propeller hub 13 and project radially outwardly therefrom for sliding engagement in sockets 21 formed in the butt ends of propeller blades 22, 23 and 24.

Figure 7:
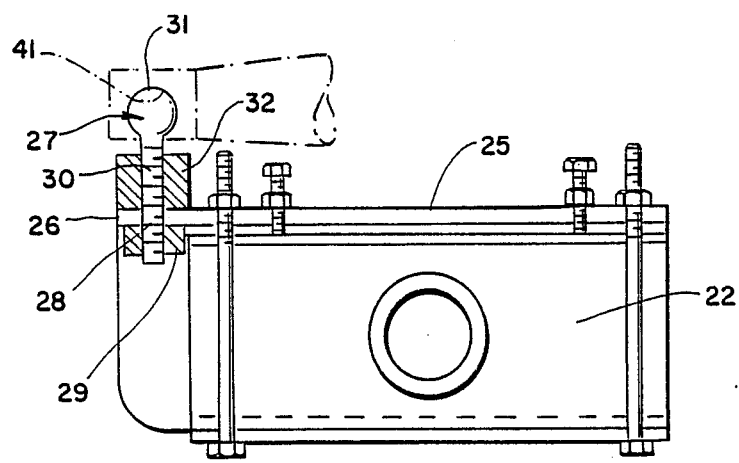
FIG. 7 is an enlarged transverse sectional view of the blade bracket and ball socket attachment of the invention.

As seen best in FIG. 7, an angle bracket 25 is secured on the butt end of each blade, and includes an extended portion 26 at one side of the blade. A ball stud 27 is threadably engaged in an opening 28 formed through the extended portion, and projects perpendicularly from the rear of the angle bracket, where it is secured by a lock nut 29. The ball stud comprises a threaded shank portion 30 with a ball 31 on the free end thereof. A second lock nut 32 may also be threaded tightly on the shank and against the face of the bracket to lock the stud in place. This second lock nut 32 is made relatively thick in its axial dimension so that it extends over substantially the entire length of the shank, thereby reinforcing the shank and minimizing the risk of failure of the stud due to large loads or a very high number of cycles of operation being imposed thereon. In a preferred embodiment of the invention, the ratio between the diameter of the stud shank at the point where it is engaged in the blade bracket, and the radius of the rotor defined by the propeller blades is at least as great as about .09 and preferably as great as .100. This ratio can be obtained in existing installations, which likely have smaller studs in place, by retro-fitting a lock nut 32 having a greater axial dimension so as to extend a substantial distance along the stud shank, as shown in FIG. 7. Existing installations now only have nut 29.

The governor yoke assembly 16 has a plurality of radially projecting arms 40 with sockets 41 in the outer, forwardly facing surfaces thereof, and the balls 31 on the ball studs are engaged in these sockets, thereby connecting the propeller blades to the yoke assembly. Accordingly, when the propeller rotates, the blades move outwardly under centrifugal force along the governor shafts, and the yoke assembly, through the ball socket connections, causes the blades to rotate on the governor shafts, thereby changing the pitch of the blades to maintain a constant RPM as the wind velocity increases above governor speed.

In a preferred embodiment, it has also been found that the best results are obtained when the ratio of the governor shaft diameter to the rotor radius is at least as great as about .120 and preferably about .140. Similarly, when the ratio of the drive shaft diameter where it leaves the hub to the rotor radius is at least as great as about .175 and preferably about .210.

Return of the blades is achieved by the use of tension springs 50 connected between an equalizer plate 51 supported on the forward end of a post member 52 extending beyond the hub, and blade brackets 53 secured on the faces of the blades in outwardly spaced relation to the butt ends thereof. Post member 52 is also the lock nut securing the governor on the tapered drive shaft. The length of post 52 should be minimized to avoid excessive side strain from the springs on the governor shafts. Multiple springs are used for each blade in many installations, but only one has been illustrated in the drawings for each blade in the present invention. It should be understood, however, that two or more springs could be used in association with each blade in the present invention.

It is preferred that the springs 50 have variable rate, so that they exert greater return force when near the end of their outward range of travel.

As noted earlier herein, prior art structures have not performed entirely satisfactorily because of the lack of any control over the constantly varying outward and inward movement of the propeller blades, and especially the inward movement. Accordingly, prior art blades impact against the hub structure and equalizer yoke with considerable force when returned inwardly under the influence of the return springs. Such springs can exert a force of upwards of about 4,000 pounds, and when sudden wind lulls are experienced, the blades are returned forcefully inwardly. Applicant's prior Pat. No. 4,068,131 partially solved the problems associated with uncontrolled movement of the propeller blades, but the structure described in this patent is capable only of controlling or damping outward movement of the blades. Inward movement is still uncontrolled. Because of this lack of control, the rotor often over- or under-pitches in a hunting action that greatly stresses the entire wind system tower and even electrical or other load systems. When it under-pitches, the rotor can absorb excessive wind loadings that in turn cause severe tower strain and oscillations.

In accordance with the present invention, a motion damping device 60 is connected with each blade for damping the movement of the blades in both the outward and the inward directions. The motion damping device preferably comprises a conventional automotive shock absorber of either the hydraulic or gas-charged variety. An example of one commercially available shock absorber which can be used is the Load-Leveler produced and sold by Monroe. This shock absorber is inexpensive and easy to obtain, and is mounted to the blades and equalizer yoke via conventional attaching means as used to secure the shock absorbers in automotive applications.

In order to provide attachment points for the shock absorbers, the equalizer plate 51 is provided with upstanding, threaded attachment studs 62, 63 and 64, as shown in FIG. 5, for receipt of the shaft 65 on the end of the shock absorber 60. These studs are angularly disposed relative to the plane of the equalizer plate so that the axis of the shaft of the shock absorber is perpendicular to the axis of the stud. The tension springs mount to openings 66 in the plate just as in conventional systems, and as seen in the drawings, are disposed beneath the shock absorbers so that the shock absorbers may be serviced and/or replaced without having to disturb the springs.

A variation of this attaching structure is shown at 70 in FIG. 6, wherein the studs are replaced with brackets 71 having openings 72 and 73 therethrough for receiving a threaded bolt 74 to extend through and secured the end 75 of shock absorber shaft 65'.

Figure 3:
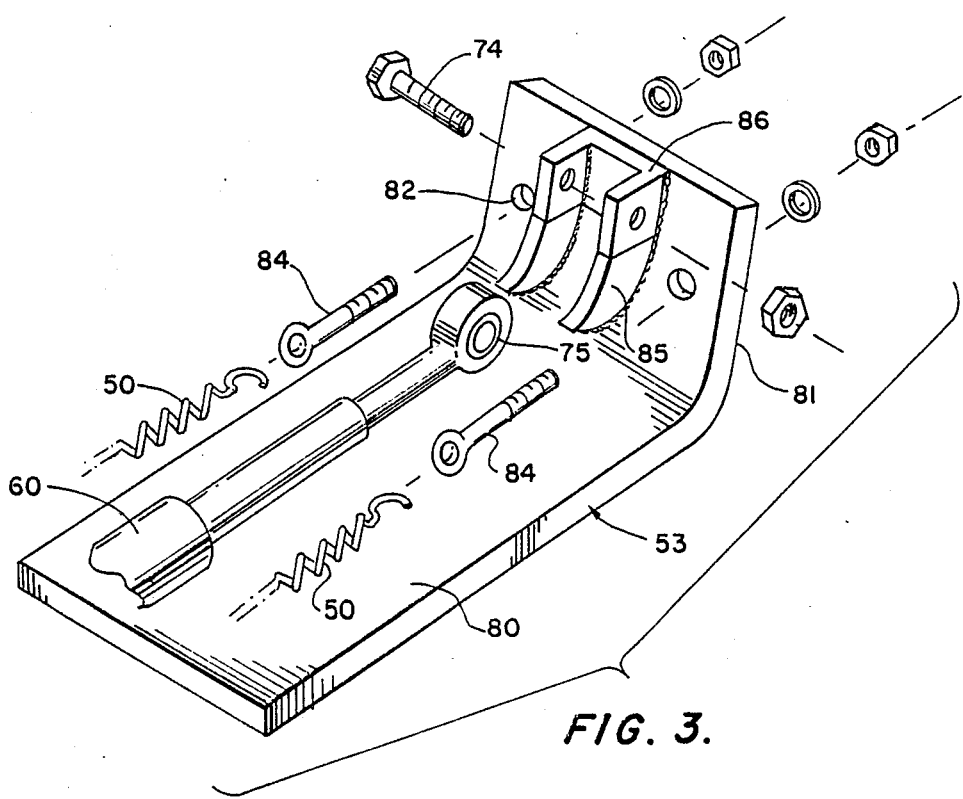
FIG. 3 is an exploded, enlarged perspective view of the blade bracket for attaching the spring(s) and motion damping means or shock absorber of the invention.
Figure 4:
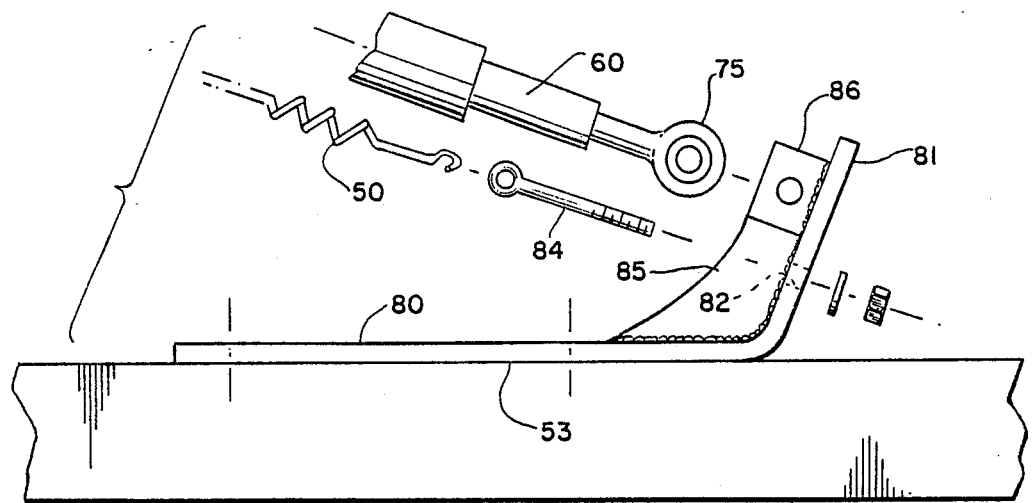
FIG. 4 is an enlarged, fragmentary exploded view in side elevation of the bracket and associated components of FIG. 3.

The other ends of the springs and shock absorbers are connected to the blade brackets 53 secured on the propeller blades. As seen best in FIGS. 3 and 4, this bracket comprises a plate 80 having an upturned end 81 with a pair of openings 82 and 83 formed therethrough for receiving a bolt 84 for attaching the spring. Reinforcing gusset plates 85 are welded to the plate in the angle formed by the upturned end, and a bracket 86 is welded to this gusset plate for connecting the end or eye 75 on the other end of the shock absorber. Of course, an upstanding threaded stud (not shown) could be used in place of the ring 86 for attachment of a shock absorber shaft such as shown in FIG. 5.

Figure 8:
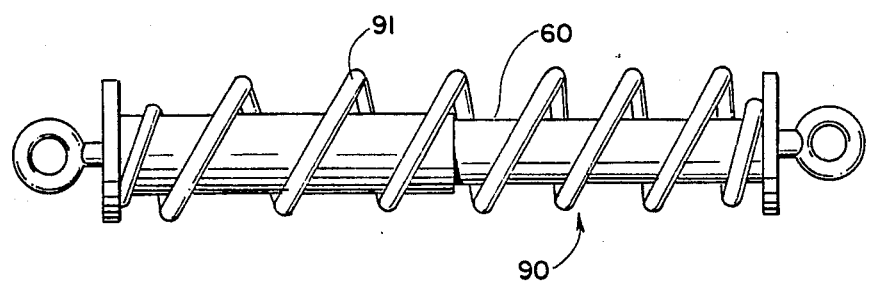
FIG. 8 is an enlarged view in side elevation of a shock absorber as used in the invention, with a coil compression spring associated therewith.

In a further variation of the invention, shown at 90 in FIG. 8, a compression coil spring 91 is disposed concentrically with the shock absorber for absorbing shock loads at the inward limit of travel of the unit and for imparting an initial impetus to outward movement of the blade at the beginning of a "feathering" movement.

A safety wrap 95 is disposed around the spring(s) and shock absorber for each blade to retain these components in their relative positions in the event of failure of one of them or their mounting attachments.

The provision of multiple motion controlling means, including the spring(s) and shock absorber for each blade provides superior control over the feathering or pitch adjusting motion of the blades, and prevents "hunting" of the blade under highly variable wind regimes. Moreover, the use of the spring(s) and shock absorber combination significantly reduces the stress imposed on the ball studs and other blade mounting and governor structures, reducing or eliminating their failure. Further, the use of the motion controlling structures described above enable smaller parts to be used for these components, if desired, for attainment of the same level of performance. Still further, safety and reliability is increased, since the redundant nature of the motion controlling means and the use of the safety strap results in retention of at least some degree of control and stability even in the event of failure of one of the components.

While only one shock absorber has been shown in association with each propeller blade, it should be understood that multiple shock absorbers could be used with each blade, if desired, and one or more tension springs could be used in combination with the shock absorbers. In addition, it should be noted that the shock absorbers could be of the adjustable variety, whereby its characteristics could be tuned to the conditions of a particular installation.

The invention as described above is intended for an upwind installation (the propeller being on the upwind side of a tower - or coming from the right as viewed in FIG. 1), but it could equally as well be used in a downwind installation. In this case, the propeller blades would be reversed in their attaching brackets and reversed on their shafts or rods so that they would be properly oriented for operating in wind coming from the left as viewed in FIG. 1.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed:

1. In a multi-blade, variable pitch wind energy plant having a rotatable output shaft with a hub fixed thereon and a plurality of propeller blades carried on governor shafts attached to the hub for movement radially outwardly under the effect of centrifugal force and movable radially inwardly under the influence of tension springs connected between the blades and an equalizing plate freely supported on the hub so that the tensile force exerted by the spring attached to each blade is transmitted through the equalizer plate to the springs attached to the other blades, and wherein pitch adjusting governor structure is connected between the blades and the hub for adjusting the pitch of the blades as they move inwardly and outwardly on the governor shafts, wherein the improvement comprises:

dual action motion damping means connected between the blades and the equalizing plate for damping movement of the blades in both their inward and outward movements on the governor shafts, said motion damping means comprising an easily replaceable automotive shock absorber having one end thereof releasably connected to the respective blade and the other end releasably connected to the equalizing plate, and disposed with its longitudinal axis parallel to the longitudinal axis of the blade; and said tension springs each having a variable spring rate whose bias or spring constant increases upon increasing deflection of the spring so that they exert greater resistance toward their limit of travel outwardly, said springs being connected at one end to a respective blade and at their other end to the equalizer plate.

2. A wind energy plant as claimed in claim 1, wherein a compression coil spring is connected in parallel with the motion damping means to absorb shock load at the inner limit of travel of the blade.

3. A wind energy plant as claimed in claim 1, wherein:

the ratio of the diameter of the governor shaft, in inches, to the radius of the rotor, in feet, defined by the propeller blades is at least as great as about .120.

4. A wind energy plant as claimed in claim 1, wherein:

the pitch adjusting governor structure comprises a governor yoke rotatable on and axially slidable relative to the output shaft, said yoke having a radially projecting arm thereon for each blade in the propeller, and each arm having a socket therein;

a ball stud fixed on each propeller blade in adjacent relationship to the yoke, each ball stud being received in a respective one of said sockets so that outward movement of the blades on the governor shafts results in pivoting or feathering movement of the blades about their longitudinal axes; and the ratio of the diameter of the ball stud, in inches, to the radius of the rotor, in feet, defined by the blades of the propeller is at least as great as about .09.

5. A wind energy plant as claimed in claim 4, wherein:

the ratio of the drive shaft diameter at the back of the hub to the radius of the rotor is at least as great as about .175.

6. A wind energy plant as claimed in claim 3, wherein:

the ratio is at least as great as .140.

7. A wind energy plant as claimed in claim 4, wherein:

the said ball stud ratio is at least as great as .100.

8. A wind energy plant as claimed in claim 5, wherein:

the drive shaft ratio is at least as great as about .210.

9. A wind energy plant as claimed in claim 5, wherein:

a compression coil spring is connected in parallel with the motion damping means to absorb shock load at the inner limit of travel of the blade.

10. A wind energy plant as claimed in claim 9, wherein:

the ratio of the diameter of the governor shaft, in inches, to the radius of the rotor, in feet, defined by the propeller blades is at least as great as about .120.

11. A wind energy plant as claimed in claim 10, wherein:

the pitch adjusting governor structure comprises a governor yoke rotatable on and axially slidable relative to the output shaft, said yoke having a radially projecting arm thereon for each blade in the propeller, and each arm having a socket therein;

a ball stud fixed on each propeller blade in adjacent relationship to the yoke, each ball stud being received in a respective one of said sockets so that outward movement of the blades on the governor shafts results in pivoting or feathering movement of the blades about their longitudinal axes; and the ratio of the diameter of the ball stud, in inches, to the radius of the rotor, in feet, defined by the blades of the propeller is at least as great as about .09.

12. A wind energy plant as claimed in claim 11, wherein:

the ratio of the diameter of the drive shaft at the back of the hub, in inches, to the radius of the rotor, in feet, defined by the propeller blades is at least as great as about .175.

13. A wind energy plant as claimed in claim 4, wherein:

the ball stud is fixed to the propeller blade via a threaded connection and a lock nut; and said lock nut is sized so as to have an axial dimension substantially as great as the length of the stud for imparting strength to the stud, said lock nut being capable of retrofit onto existing studs to achieve said ratio.

14. A wind energy plant as claimed in claim 1, wherein:

the tension springs and motion damping means extend in closely spaced, parallel relationship with one another; and a safety wrap is disposed around the tension spring and motion damping means to retain them in their relative positions in the event of failure of one of them or their mounting attachments.

15. A wind energy plant as claimed in claim 1, wherein:

the blades are each attached to a bracket which is, in turn, connected to said pitch adjusting governor structure, said blades and associated brackets being slidable as a unit on said governor shafts.

16. A wind energy plant as claimed in claim 15, wherein:

said propeller blades are positioned on the upwind side of a support tower.

17. A wind energy plant as claimed in claim 15, wherein:

said propeller blades are positioned on the downwind side of a support tower, and the propeller blades and support brackets are reversed on the governor shafts for proper orientation of the blades relative to wind direction.

* * * * *